March 11, 1952 J. A. HOLM 2,588,837
AUTOMATIC FISHING REEL BRAKE
Filed March 17, 1948
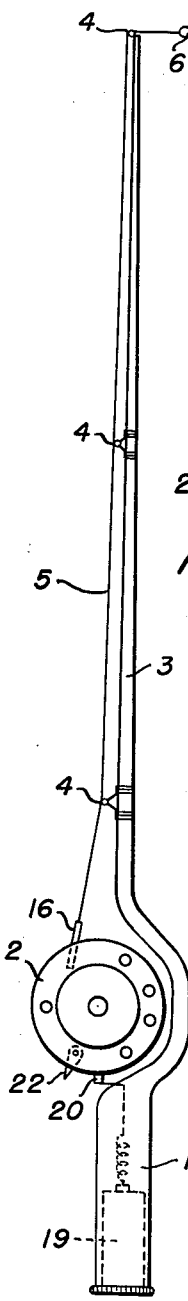
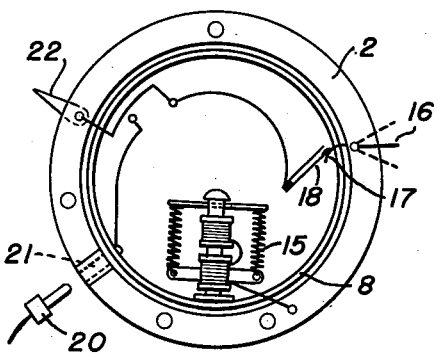
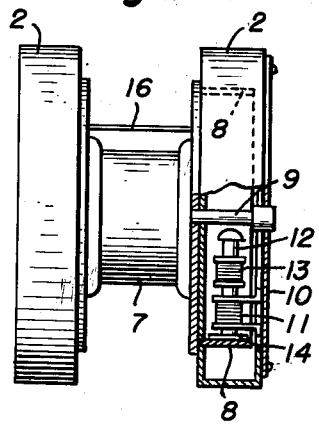
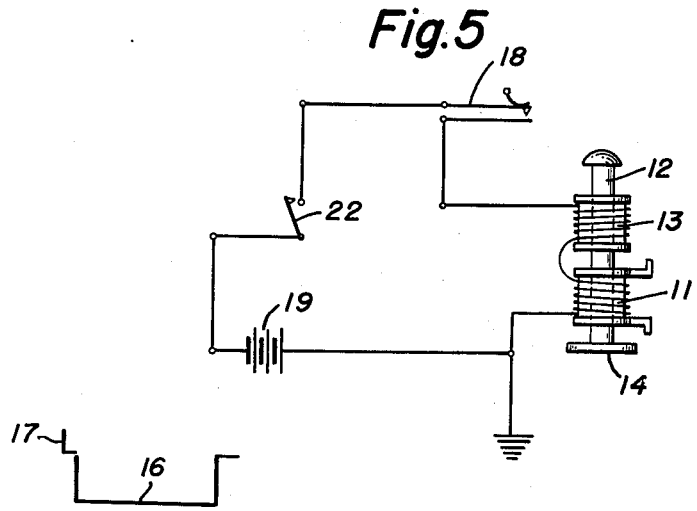
INVENTOR
JOHAN ALFRED HOLM,
BY Singer, Ehlert, Stern & Carlberg
ATTORNEYS Patented Mar. 11, 1952

2,588,837

UNITED STATES PATENT OFFICE 2,588,837

AUTOMATIC FISHING REEL BRAKE

Johan Alfred Holm, Malatrask, Sweden

Application March 17, 1948, Serial No. 15,416
In Sweden April 11, 1947

5 Claims. (Cl. 242—84.5)

The present invention relates to automatic braking devices for reels, and more particularly to a braking device adapted to be associated with the reel of fishing tackle equipment to prevent rotation of the reel at least in one direction when the speed at which line is payed out falls below a predetermined rate.

Various types of brakes, commonly known as anti-back lash devices, for fishing tackle reels have been proposed in the past. The present device is an improvement over these various devices, and the invention is characterized essentially by the provision of a braking ring which is actuated by an electromagnetically controlled brake, current for the electromagnet being supplied only when the line is slack.

In the accompanying drawing one embodiment of the invention is shown. Fig. 1 is a side elevation view of a casting rod provided with a reel and braking device in accordance with the invention. Fig. 2 is a side view of the reel itself, partly in section. Fig. 3 is a plan view of the reel. Fig. 4 is a detail and Fig. 5 is an electrical wiring diagram of the electric parts included in the braking device.

The casting rod shown in Fig. 1 is provided, in the usual manner, with a handle 1, flanges 2, between which the reel is journalled, and, a rod 3 having eyelets 4, through which the line 5 is drawn. At the extreme end of the line 5 there is a hook 6, on which the bait is placed.

According to Figs. 2 and 3, a reel 7 is journalled in the usual manner between the two flanges 2. On the shaft 9 of the reel is mounted a braking ring 8, which is completely covered and protected by a covering plate 10 secured to the flange 2. To the said covering plate is attached a coil 11, in which a brake rod 12, provided with another coil 13, is movable. The brake rod 12 is provided at one end with a brake shoe 14 of rubber or the like, which is intended to act on the braking ring 8 in the manner indicated hereinafter. The movable coil 13 and thus also the brake rod 12 are moreover acted on by two springs 15 (Fig. 2), which tend to bring the brake shoe 14 out of contact with the braking ring 8.

Between the two flanges 2 is pivotally arranged a wire 16, formed as shown in Fig. 4 from piano wire and so positioned that it rests on the line 5 of the casting rod (see Fig. 1) when the line is taut, i. e. when the cast is being made. If, now, the reel 7, owing to the pull on the line 5, should revolve at too high a speed, so that the line 5 begins to slacken close to the reel 7, the wire 16 will pivot inwardly toward the axis of the reel. An arm 17 placed on the wire 16 will then act on a spring contact 18 (see Figs. 2 and 5), which closes the circuit from a battery 19 (see Figs. 1 and 5), so that current passes through the two coils 11 and 13. The movable coil 13 is then attracted by the fixed coil 11, and the brake rod 12 with the brake shoe 14 is carried towards the braking ring 8, whereby the speed of the reel 7 is reduced. Because of the reduction in speed, the line 5 will again become taut, so that the wire 16 will again be lifted or moved away from the axis of the reel and the arm 17 will be moved out of engagement with the spring contact 18. The circuit will then be broken, and the braking rod 12 will be returned to its normal position by the springs 15.

The one pole of the battery 19 is connected by a contact 20 to a connecting plug 21 (Fig. 2), whilst the other pole of the battery is grounded in the handle 1, which is preferably made of metal. In making the cast, the current is switched on with a manually controlled switch 22, which, however, can be used also in case the spring contact 18, for some reason, should get caught.

When the cast is made, the line 5 is somewhat taut, but as soon as the reel 7 begins to revolve more rapidly than the pull on the line, the circuit is closed by the spring contact 18, and the brake shoe 14 immediately enters into operation. The brake, however, does not operate any longer than is really necessary, for, when the line 5 is again taut, the circuit is broken and the braking action ceases. In this way the brake continues to operate during the cast. We see that the brake does not affect the range of the cast, but acts on the reel, and only when it is revolving too fast. With this device one will get the full advantage of a lightly running reel.

The strength of current required is relatively great, but as the circuit is closed merely for a few seconds during the cast, this matter is of no importance. A small 1.5 volt battery has been found sufficient for the purpose. As the brake shoe 14 acts on a ring 8 the diameter of which is large in proportion to the reel 7, the braking effect will be very considerable. The movable wire 16, which effects the closing and breaking of the current, is made very light, so that its movement is the result of its own weight.

A great advantage of this construction is that the brake need not be changed or adjusted when one bait is changed for another of a different weight. This is of great practical importance in fishing, when the angler has no time for experimenting with brakes.

It will be clear to those versed in the art that the device is as applicable to the trolling method of fishing as it is to the casting method of fishing.

The execution of the invention described above and illustrated in the drawing should, of course, be regarded merely as an example, and may be varied in manifold ways without departing from the fundamental principle of the invention.

What I claim is:

1. In a fishing reel having a frame and a reel rotatably supported by said frame, a brake ring secured to said reel, an electromagnet secured to said frame, a rod reciprocably associated with said electromagnet for movement toward and away from said brake ring, an electromagnet mounted on said rod, a brake shoe mounted on said rod for engagement with said brake ring and means responsive to the occurrence of slack in the line being payed off said reel to effect energization of said electromagnets, whereby said magnets are attracted to each other causing movement of said rod to bring said brake shoe into engagement with said brake ring.

2. In a fishing reel having a frame and a reel rotatably supported by said frame, a brake ring secured to said reel, an electromagnet secured to said frame, a rod reciprocably associated with said electromagnet for movement toward and away from said brake ring, an electromagnet mounted on said rod, a brake shoe mounted on said rod for engagement with said brake ring, said brake shoe being normally positioned out of engagement with said brake ring, and means responsive to the occurrence of slack in the line being payed off said reel to effect energization of said electromagnets, whereby said magnets are attracted to each other causing movement of said rod to bring said brake shoe into engagement with said brake ring.

3. In a fishing reel having a frame and a reel rotatably supported by said frame, a brake ring secured to said reel, an electromagnet secured to said frame, a rod reciprocably associated with said electromagnet for movement toward and away from said brake ring, an electromagnet mounted on said rod, a brake shoe mounted on said rod for engagement with said brake ring, a spring acting on said rod to normally position said brake shoe out of engagement with said brake ring, and means responsive to the occurrence of slack in the line being payed off said reel to effect energization of said electromagnets, whereby said magnets are attracted to each other with sufficient force to overcome said spring thusly causing movement of said rod to bring said brake shoe into engagement with said brake ring.

4. A fishing reel for paying out and winding in fishing line, comprising a frame, a reel rotatably supported by said frame, an electromagnet secured to said frame, a brake ring secured to said reel, a rod reciprocably associated with said electromagnet for movement toward and away from said brake ring, an electromagnet mounted on said rod, a brake shoe mounted on said rod for engagement with said brake ring, a source of electric energy, an electric circuit connecting said source to said electromagnets, a switch in said circuit normally holding same open, a wire pivotally secured to said frame and arranged to engage said line and to actuate said switch, said wire being moved to a position in which said switch is open when said line being payed out is taut and being movable as a result of its own weight when slack occurs in said line to close said switch and thusly said circuit, whereby said electromagnets are energized and attracted to one another causing movement of said rod to bring said brake shoe into engagement with said brake ring.

5. An automatic braking device for fishing reels having a frame and a reel rotatably supported by said frame, comprising a brake ring mounted on said reel, an electromagnet secured to said frame, a rod reciprocably associated with said electromagnet for movement toward and away from said brake ring, an electromagnet mounted on said rod, a brake shoe on said rod for engagement with said brake ring, a wire pivotally supported by said frame, said wire being positioned beyond the outer periphery of said reel and extending parallel thereto across the full width of said reel, said wire being so positioned as to be moved by a fishing line as said line is payed off said reel, an arm carried by said wire, a two contact switch secured to said frame adjacent the pivotal axis of said wire, said arm being arranged to close the contacts of said switch upon movement of said wire, a source of electric energy, an electric circuit connecting said source of energy with one contact of said switch, an electric circuit connecting the other contact of said switch and both said electromagnets in series, whereby upon occurrence of slack in said line said wire will be moved by its own weight and cause said arm to close said switch effecting energization of said electromagnets, whereupon said electromagnets will be attracted to one another to cause movement of said rod to bring said brake shoe into engagement with said brake ring.

JOHAN ALFRED HOLM.

REFERENCES CITED

The following references are of record in the file of this patent:

UNITED STATES PATENTS

| Number | Name | Date |
| --- | --- | --- |
| 1,062,488 | McCluer et al. | May 20, 1913 |
| 1,286,331 | James | Dec. 3, 1918 |
| 1,554,133 | Schmid | Sept. 15, 1925 |
| 1,990,643 | Fankboner | Feb. 12, 1935 |
| 2,002,137 | Bruenn | May 21, 1935 |
| 2,262,462 | Margis, Jr. | Nov. 11, 1941 |
| 2,457,075 | Williams | Dec. 21, 1948 |